United States Patent
Suess

(10) Patent No.: US 8,733,382 B2
(45) Date of Patent: May 27, 2014

(54) THERMALLY ACTIVATED SAFETY VALVE FOR PRESSURE VESSELS

(75) Inventor: Uwe Suess, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 1502 days.

(21) Appl. No.: 11/622,518

(22) Filed: Jan. 12, 2007

(65) Prior Publication Data

US 2008/0171248 A1  Jul. 17, 2008

(51) Int. Cl.
- F16K 17/38 (2006.01)
- F16K 17/14 (2006.01)
- B65D 25/10 (2006.01)

(52) U.S. Cl.
USPC .................. 137/68.12; 137/468; 220/580

(58) Field of Classification Search
USPC ........... 220/581, 203.8, 201, 467.3, 580, 586, 220/202, 592.01, 592.28, 203.01, 203.02, 220/203.03, 255.1, 258.1, 359.1, 359.4, 220/611, 560.08; 137/468, 457, 137/68.11–68.19, 72–75; 429/442, 515
See application file for complete search history.

(56) References Cited

U.S. PATENT DOCUMENTS

| | | | |
|---|---|---|---|
| 3,480,173 A * | 11/1969 | Wheaton | 215/251 |
| 3,906,976 A * | 9/1975 | Nohr et al. | 137/68.26 |
| 4,059,125 A * | 11/1977 | Sugimura et al. | 137/73 |
| 4,744,383 A * | 5/1988 | Visnic et al. | 137/72 |
| 4,750,510 A * | 6/1988 | Short, III | 137/1 |
| 5,320,127 A * | 6/1994 | Yanagihara et al. | 137/72 |
| 5,443,286 A | 8/1995 | Cunningham et al. | |
| 5,762,091 A * | 6/1998 | Sarne et al. | 137/74 |
| 5,813,429 A | 9/1998 | Ohtaka et al. | |
| 5,848,604 A * | 12/1998 | Eihusen | 137/72 |
| 6,006,774 A * | 12/1999 | Lhymn et al. | 137/72 |
| 6,029,686 A * | 2/2000 | Pirkle | 137/62 |
| 6,116,271 A * | 9/2000 | Nickel | 137/508 |
| 6,367,499 B1 | 4/2002 | Taku | |
| 6,382,232 B1 | 5/2002 | Portmann | |
| 6,418,962 B1 | 7/2002 | Wozniak et al. | |
| 6,662,827 B1 | 12/2003 | Clougherty et al. | |
| 6,742,554 B1 | 6/2004 | Immel | |
| 2006/0127733 A1* | 6/2006 | Kaschmitter et al. | 429/34 |
| 2006/0163261 A1* | 7/2006 | Sugiura et al. | 220/581 |
| 2007/0045312 A1* | 3/2007 | Abercrombie et al. | 220/212 |
| 2008/0066508 A1* | 3/2008 | Chao et al. | 70/358 |

FOREIGN PATENT DOCUMENTS

| | | |
|---|---|---|
| DE | 2 229 620 | 1/1974 |
| DE | 298 09 230 U1 | 9/1999 |

* cited by examiner

*Primary Examiner* — Bryon Gehman
*Assistant Examiner* — Shawn M Braden
(74) *Attorney, Agent, or Firm* — Fraser Clemens Martin & Miller LLC; J. Douglas Miller

(57) ABSTRACT

A pressure vessel is provided having an outer support layer having an inner surface; a composite wrap disposed adjacent to the inner surface; and a liner disposed adjacent to the fiber composite wrap. Further provided is an adapter disposed at a first end of the pressure vessel and configured for charging a cavity formed by the pressure vessel with a compressed fuel, wherein the adapter includes a first pressure relief device; and a second pressure relief device disposed at a second end of the pressure vessel. The second pressure relief device defines a passage through the outer support layer and the composite wrap and has a chamber and a diaphragm disposed between the chamber and the cavity. Also described are a fuel cell propulsion system and a vehicle including the provided pressure vessel.

20 Claims, 2 Drawing Sheets

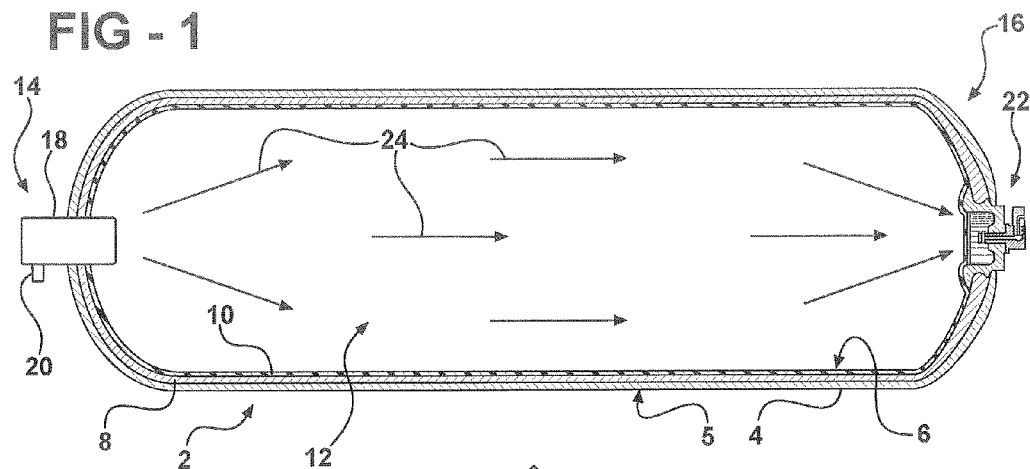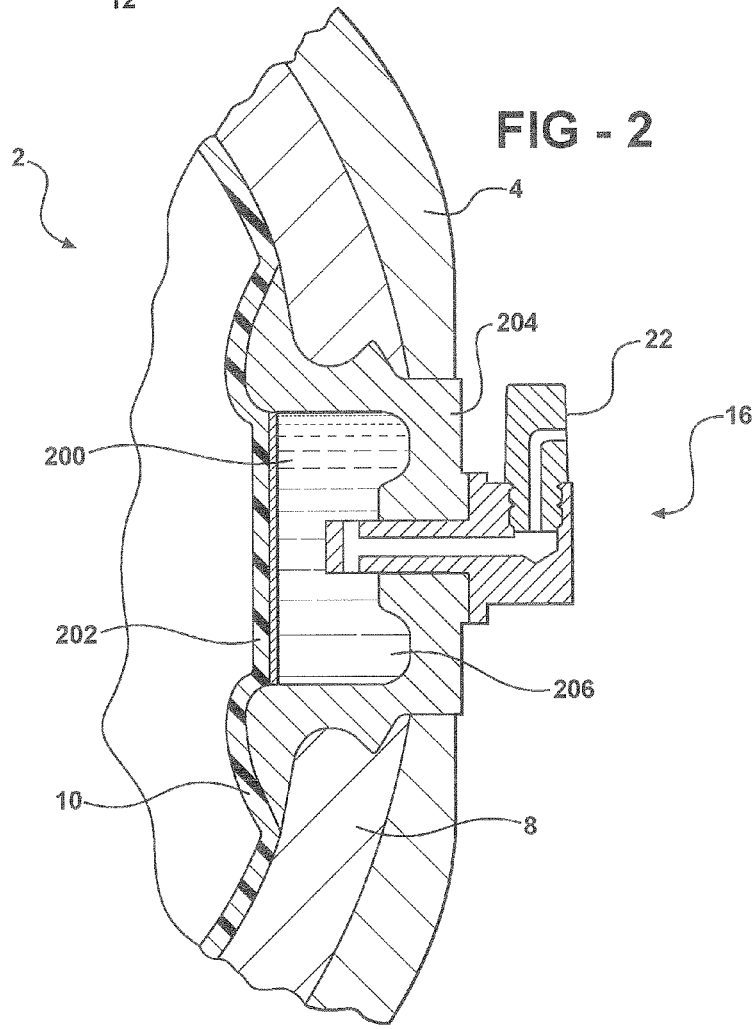

THERMALLY ACTIVATED SAFETY VALVE FOR PRESSURE VESSELS

FIELD OF THE INVENTION

Figure 3:
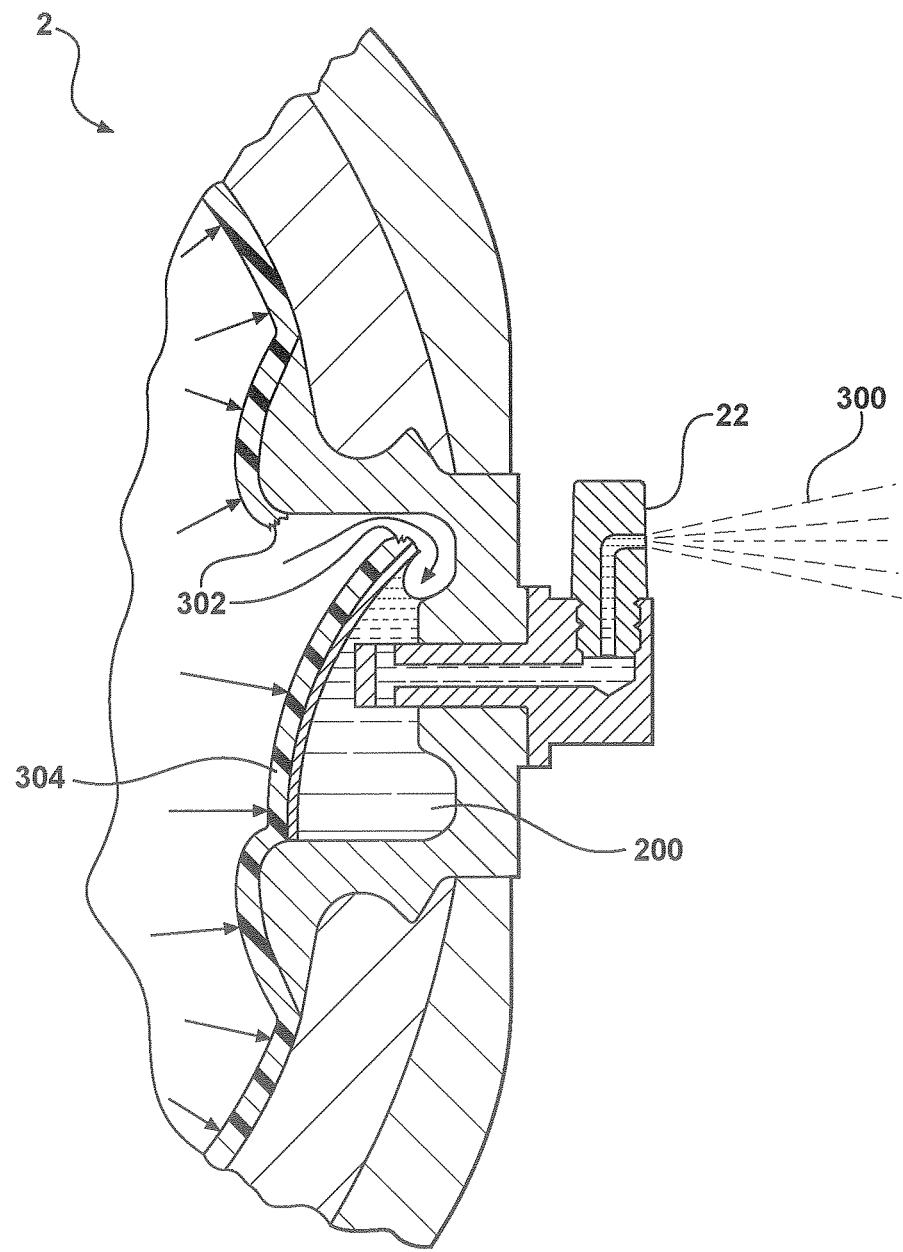

The present invention relates to a fuel cell powered vehicle and more particularly to a fuel storage tank for a fuel cell powered vehicle.

BACKGROUND OF THE INVENTION

Fuel cell power systems have been proposed as a clean, efficient and environmentally responsible power source for electric vehicles and various other applications. One type of fuel cell power system employs use of a proton exchange membrane (PEM) to catalytically facilitate reaction of fuels (such as hydrogen) and oxidants (such as air or oxygen) into electricity. Typically, the fuel cell power system has more than one fuel cell that includes an anode and a cathode with the PEM therebetween. The anode receives the hydrogen gas and the cathode receives the oxygen. The hydrogen gas is ionized in the anode to generate free hydrogen ions and electrons. The hydrogen ions pass through the electrolyte to the cathode. The hydrogen ions react with the oxygen and the electrons in the cathode to generate water as a by-product. The electrons from the anode cannot pass through the PEM, and are instead directed through a load to perform work before being sent to the cathode. The work acts to operate the vehicle. Many fuels cells are combined in a fuel cell stack to generate the desired power.

The fuel cell power system can include a processor that converts a liquid fuel, such as alcohols (methanol or ethanol), hydrocarbons (gasoline), and/or mixtures thereof, such as blends of ethanol/methanol and gasoline, to the hydrogen gas for the fuel cell stack. Such liquid fuels are easy to store on the vehicle. Further, there is a nationwide infrastructure for supplying the liquid fuels. Gaseous hydrocarbons, such as methane, propane, natural gas, LPG, etc., are also suitable fuels for both vehicle and non-vehicle fuel cell applications. Various reformers or processors are known in the art for converting the liquid fuel to gaseous hydrogen suitable for the fuel cell.

Alternatively, the hydrogen gas can be processed separate from the vehicle and stored at a filling stations and the like. The hydrogen gas is transferred from the filling station to a high pressure vessel or container on the vehicle to supply the desired hydrogen gas to the fuel cell engine as needed. The high pressure vessels are typically classified into one of four types: a Type I vessel having an all-metal construction; a Type II having a metal lined construction with a fiberglass hoop wrap; a Type III having a metal lined construction with a composite full wrap; and a Type IV having a plastic lined construction with a composite full wrap.

High pressure vessels containing a compressed hydrogen gas must have a mechanical stability and an integrity that militates against a rupture or bursting of the pressure vessel from the pressure within. It is also typically desirable to make the pressure vessels on vehicles lightweight so as not to significantly affect the weight requirements of the vehicle. The current trend in the industry is to employ the Type IV pressure vessel for storing the compressed hydrogen gas on the vehicle.

As is reported by Immel in U.S. Pat. No. 6,742,554, herein incorporated by reference in its entirety, the Type IV pressure vessel contemplated in the industry for storage of hydrogen gas is cylindrical in shape to provide the desired integrity, and includes an outer structural wall and an inner liner defining a container chamber therein. The combination of the outer wall and the liner provide the desired structural integrity, pressure containment, and gas tightness in a light-weight and cost effective manner.

The Type IV pressure vessel typically includes an adapter that provides the inlet and outlet opening for the hydrogen gas contained therein. The adapter typically houses the various valves, pressure regulators, piping connectors, excess flow limiter, etc. that allow the pressure vessel to be filled with the compressed hydrogen gas, and allow the compressed gas to be discharged from the pressure vessel at or near ambient pressure, or a higher pressure, to be sent to the fuel cell engine. The adapter is generally made of steel to provide a desired structural strength for storing compressed hydrogen gas. A suitable adhesive, sealing ring, or the like is employed to seal the liner to the adapter in a gas tight manner, and secure the adapter to the outer wall.

High pressure vessels are also generally designed with a thermally activated safety valve or pressure relief device (PRD), typically located at the adapter or opening of the pressure vessel. A PRD is a necessary component for a variety of safety reasons, including situations involving accidental damage to the fuel cell power system and the potential for resulting high temperatures or fire. The use of more than one PRD is desirable, in particular where high temperatures might occur at a side opposite the PRD in conventional pressure vessels. However, having more than one PRD has required an expensive construction that includes the drilling of an additional liner opening for placement of a second adapter and PRD. This drilling operation generally must occur during the final stages of a vessel manufacturing process and must be very precise in order to maintain the vessel integrity. A risk of irreparably damaging the vessel at these stages is also significant.

There is a continuing need for a high pressure vessel for the storage of hydrogen having a second pressure relief device for improved safety. Desirably, the pressure vessel also is constructed without significantly affecting the complexity of the vessel construction.

SUMMARY OF THE INVENTION

In concordance with the instant disclosure, a high pressure vessel having a second pressure relief device for improved safety, the vessel not requiring a second drilling operation for installation of the second pressure relief device, is surprisingly discovered.

In one embodiment, a pressure vessel is provided including an outer support layer having an inner surface; a composite wrap disposed adjacent to the inner surface; and a liner disposed adjacent to the fiber composite wrap. An adapter is further disposed at a first end of the pressure vessel and configured for charging a cavity formed by the pressure vessel with a compressed fuel. The adapter includes a first pressure relief device disposed at the first end and a second pressure relief device disposed at a second end of the pressure vessel. The adapter defines a passage through the outer support layer and the composite wrap. The second pressure relief device has a chamber and a diaphragm disposed between the chamber and the cavity.

In another embodiment, a fuel cell propulsion system is provided having a fuel cell system with a fuel cell stack. The fuel cell stack includes a plurality of fuel cells and is configured to receive a compressed fuel from the pressure vessel. A vehicle including the fuel cell propulsion system is also described.

DRAWINGS

The above, as well as other advantages of the present disclosure, will become readily apparent to those skilled in the art from the following detailed description, particularly when considered in the light of the drawings described hereafter.

FIG. 1 is a side cross-sectional view of a Type IV pressure vessel according to the present disclosure;

FIG. 2 is a fragmentary cross-sectional view of an end of the Type IV pressure vessel depicted in FIG. 1, further showing a non-activated second pressure relief device; and FIG. 3 is a fragmentary cross-sectional view of an end of the Type IV pressure vessel depicted in FIG. 1, further showing an activated second pressure relief device.

DETAILED DESCRIPTION OF THE INVENTION

The following description is merely exemplary in nature and is not intended to limit the present disclosure, application, or uses. It should also be understood that throughout the drawings, corresponding reference numerals indicate like or corresponding parts and features.

FIG. 1 depicts a cross-sectional view of a Type IV pressure vessel 2 according to one embodiment of the present invention. The pressure vessel 2 includes an outer support layer 4 having an outer surface 5 and an inner surface 6. Typically, the outer support layer 4 is formed from a material having a sufficient thickness and mechanical rigidity to contain a pressure experienced by the pressure vessel 2. The outer support layer 4 also provides a resistance to impact. In one embodiment, the outer support layer 4 includes one of a plastic, composite material, and metal. In a particular embodiment, the outer support layer 4 is formed from a metal, for example steel, aluminum, and titanium. One of skill in the art should appreciate that other materials can be chosen as desired. Further, the pressure vessel 2 is generally cylindrical in shape to provide a desired integrity, although it should be appreciated that other shapes may also be used.

A composite wrap 8 is disposed adjacent to the inner surface 6 of the outer support layer 4. The composite wrap 8 generally provides additional structural support to the pressure vessel 2, particularly in combination with the outer support layer 4. The composite wrap 8 can be formed from various composite materials including, as non-limiting examples, plastic composites, glass composites, carbon composites, and combinations thereof. The composite materials forming the composite wrap 8 are generally fibrous and include synthetic fibers, as non-limiting examples glass fibers, polymeric fibers, and carbon fibers. In particular embodiments, the composite wrap 8 comprises aramid fibers. In other embodiments, the composite wrap includes carbon fibers. It should be appreciated that the composite wrap 8 can be formed from other suitable composites as desired.

The pressure vessel 2 also includes a liner 10 disposed adjacent to the composite wrap 8. The liner 10 defines a vessel cavity 12 and is a barrier that inhibits a permeation of a compressed fuel from the pressure vessel 2. The liner 10 material should be durable in the range of operating temperatures experienced by the pressure vessel 2 while in service. The liner 10 is typically thin to maintain a pressure vessel 2 that is light-weight. As a non-limiting example, the polymer liner 10 thickness is less than about 10 mm, and in particular embodiments less than about 5 mm. Other thicknesses may be used as desired, however, being based at least in part on a material selected to form the liner 10. In particular embodiments the liner 10 is formed from a polymeric material, for example a thermoplastic. Non-limiting examples of thermoplastic materials suitable for the polymer liner 10 include polyethylenes, nylons, polyvinyl chlorides, celluloses, vinyl chloride copolymers, polyimides, and combinations thereof.

In one embodiment, a suitable thermoplastic material includes high density polyethylene (HDPE). One of skill in the art should appreciate that other polymers may be used.

The pressure vessel 2 further has a first end 14 and a second end 16. An adapter 18 is disposed at the first end 14 of the pressure vessel 2 and forms a passage through the outer support layer 4, the composite wrap 8, and the liner 10. The passage is in communication with the vessel cavity 12. The adapter 18 is typically a steel structure that houses various components, including valves, pressure regulators, piping connectors, excess flow limiters, etc. These additional components allow the pressure vessel 2 to be charged with a compressed fuel, for example hydrogen gas, and allow the compressed fuel to be discharged from the pressure vessel 2 at or near ambient pressure, or a higher pressure if desired, to a fuel cell propulsion system. A suitable adhesive, sealing ring, or the like is also employed to seal the liner 10 to the adapter 18 for retention of the compressed fuel. The suitable adhesive, sealing ring, or the like also secures the adapter 18 to the outer support layer 4.

The adapter 18 also includes a first pressure relief device (PRD) 20. The PRD 20 is typically in communication with the vessel cavity 12 and opens to vent the compressed fuel at a controlled rate through a PRD vent conduit (not shown). In particular, the first PRD 20 is thermally activated in the event of an exposure to a predetermined temperature or a vehicle fire involving the pressure vessel 2. The PRD 20 is typically activated as a result of exposure to the heat of a flame. As a nonlimiting example, the PRD 20 may activate upon reaching a temperature greater than about 120° C. In some embodiments, the PRD 20 includes a mechanism involving a solder (not shown) that melts at a desired or critical temperature. In another embodiment, the PRD 20 includes a glass container filled with fluid (not shown) which bursts at the aforementioned temperature. The melting of the solder or breaking of the fluid-filled glass container causes the PRD 20 to open, thus venting the contents of the pressure vessel cavity 12. It should be understood that PRD devices that vent upon exposure to the temperature or a pressure are also suitable.

The second end 16 of the pressure vessel 2 includes a second PRD 22. The second PRD 22 generally forms a passage through the outer support layer 4 and the composite wrap 8, ending at the liner 10. As with the first PRD 20, a suitable adhesive, sealing ring, or the like is employed to seal the PRD 22 to the outer support layer 4 for retention of the compressed fuel. The unactivated state of the second PRD 22 is closed. However, the second PRD 22 is activated in the event of high operating temperatures or a vehicle fire, for example a vehicle fire occurring at the second end 16 of the pressure vessel 2. The second PRD 22 may employ the same or similar mechanisms as the first PRD 20 for opening. The presence of the second PRD 22 provides a second point of pressure relief should fire afflict the second end 16 of the pressure vessel 2 before afflicting the first end 14.

As is depicted in FIG. 2, the second PRD 22 can include a chamber 200 and a diaphragm 202. The chamber 200 can be formed, for example, in an aft boss 204 disposed at the second end 16 of the pressure vessel 2. The chamber 200 envelopes a chamber material 206. The chamber material 206 is typically composed of a material that is substantially incompressible. The chamber material 206 supports the diaphragm 202 against a pressure in the internal cavity 12 provided by the compressed fuel 24. The chamber material 206 can be a liquid material, for example an oil. In some embodiments, the chamber material 206 is a solid material having a melting temperature below a desired temperature for venting the compressed fuel 24. As a nonlimiting example, the chamber material 206 can be a wax or a resin having a melting temperature of less than about 120° C. The volumetric thermal expansion coefficient of the chamber material 206 is also of a range which militates against thermal expansion and a deflection of the diaphragm 202. Particularly, the volumetric thermal expansion coefficient of suitable chamber materials 206 does not lead to a deflection and an undesirable deformation of the diaphragm with a change in temperature. Liquids and solids having suitable melting temperatures and thermal expansion coefficients can be selected by one of ordinary skill in the art as desired.

The compressed fuel 24 of the present invention may be a compressed liquid or a compressed gas such as, for example, hydrogen, oxygen, nitrogen or air. In particular embodiments, the compressed fuel 24 includes a hydrogen gas which is provided to a fuel cell stack as a fuel. Typical pressures associated with the compressed fuel 24 for fuel cell applications can be in a range from about 200 bar to about 700 bar, although it is recognized that other pressures may also be used.

The diaphragm 202 is typically disposed at a side of the chamber 200 adjacent to the liner 10. In some embodiments, the diaphragm 202 is formed from the liner 10. In one embodiment, the diaphragm 202 comprises a metal foil or thin metal partition disposed between the chamber 200 and the liner 10. The thickness of diaphragm 202 and the liner 10 can be chosen to facilitate rupture thereof, particularly upon an application of a desired quantity of pressure. For example, a pressure typically contained by the pressure vessel 2 storing the compressed fuel 24 can rupture the diaphragm 202. It is noted that diaphragm 202 can also having a scored surface, thereby controlling the point at which a fracture may occur upon activation of the second PRD 22. Alternatively, the diaphragm may have a profile including a portion with a lower thickness to control the location or shape of the fracture.

In reference to FIG. 3, it should be appreciated that the diaphragm 202 does not rupture from the pressure within the cavity 12 when the second PRD 22 is not activated and when the chamber 200 is filled with the chamber material 206. To this end, the chamber material 206 typically militates against a rupturing of the diaphragm 202, but is configured to fracture upon an activation of the second PRD 22. Upon activation of the second PRD 22, the chamber material 206 is caused to exit from the chamber 200, such as by the cavity 12 pressure, for example. The chamber material 206 thus becomes an ejected material 300. The cavity 12 pressure urges a deflection and ultimately a fracture 302 of the diaphragm 202, particularly when a quantity of the chamber material 206 is expelled from the chamber 200. In further embodiments, an adjacent portion 304 of the liner 10 with respect to the diaphragm 202 collapses simultaneously with the diaphragm 202. As the chamber material 206 is ejected from the chamber, a passage forms that extends from the cavity 12 of the pressure vessel 2 and through the chamber 200 and the second PRD 22, allowing the compressed fuel 24 to exit the cavity 12 and vent from the pressure vessel 2.

One of ordinary skill in the art should recognize that the manufacturing of a pressure vessel 2 according to the present invention does not require a drilling operation in a final stage of a manufacturing process to produce a liner opening, particularly because the second PRD 22 does not extend through the liner 10 in an unactivated state. The second PRD 22 can be disposed in the aft boss 204 at the second end 16 of the pressure vessel 2. Illustratively, the second PRD 22 can be integral with the aft boss 204, thereby avoiding the use of additional parts and reducing an overall complexity of manufacturing the vessel 2. Moreover, the use of the second PRD 22 provides two different locations on the pressure vessel 2 for venting of the compressed fuel 24 in case of an emergency involving high temperatures or fire.

As should be appreciated, the pressure vessel 2 of the present disclosure can be utilized in a fuel cell propulsion system as a source of power for a vehicle, for example an automobile. In particular, the pressure vessel 2 can be configured to deliver a compressed hydrogen fuel to a fuel cell system having a fuel cell stack with a plurality of fuel cells. Alternative compressed fuels also suitable for use in fuel cells can similarly be supplied by the pressure vessel 2 to a fuel cell system configured for receiving the alternative compressed fuel.

While certain representative embodiments and details have been shown for purposes of illustrating the invention, it will be apparent to those skilled in the art that various changes may be made without departing from the scope of the disclosure, which is further described in the following appended claims.

What is claimed is:

1. A pressure vessel comprising:
   an outer support layer having an inner surface;
   a liner disposed adjacent to the inner surface of the outer support layer, an inner surface of the liner defining a closed cavity within the pressure vessel and
   a first pressure relief device disposed in the outer support layer, the first pressure relief device having:
   a main body with a chamber enveloping a chamber material, the chamber material filling the chamber, and
   a diaphragm abutting the liner and disposed between the chamber and the cavity, the chamber material abutting the diaphragm and supporting the diaphragm against a pressure of the cavity,
   wherein the diaphragm is adapted to rupture upon activation of the first pressure relief device and facilitate an evacuation of the chamber material and a compressed fuel from the cavity through the pressure relief device.

2. The pressure vessel of claim 1, further comprising a composite wrap disposed between the outer support layer and the liner.

3. The pressure vessel of claim 1, further comprising an adapter disposed at a first end of the pressure vessel and configured for charging the cavity with the compressed fuel, wherein the adapter includes a second pressure relief device.

4. The pressure vessel of claim 3, wherein the main body is a boss disposed at a second end of the pressure vessel.

5. The pressure vessel of claim 1, wherein the first pressure relief device activates at a temperature greater than about 120° C.

6. The pressure vessel of claim 1, wherein the liner includes a polymeric material.

7. The pressure vessel of claim 6, wherein the polymeric material is a thermoplastic.

8. The pressure vessel of claim 1, wherein the diaphragm comprises a foil.

9. The pressure vessel of claim 1, wherein the chamber material is substantially incompressible.

10. The pressure vessel of claim 1, wherein the chamber material is a liquid.

11. The pressure vessel of claim 10, wherein the chamber material is a wax.

12. The pressure vessel of claim 1, wherein the chamber material is a solid having a melting temperature of less than about 120° C.

13. The pressure vessel of claim 1, wherein the first pressure relief device is disposed in a boss, the boss contacting the outer support layer and the liner.

14. The pressure vessel of claim 1, wherein the diaphragm includes a scored surface prior to activation of the first pressure relief device to control a rupture point upon activation of the first pressure relief device.

15. The pressure vessel of claim 1, wherein the diaphragm has a profile that includes a portion with a lower thickness prior to activation of the first pressure relief device to control a rupture location or a shape of a rupture upon activation of the first pressure relief device.

16. The pressure vessel of claim 1, wherein the diaphragm includes at least one of a scored surface and a profile that includes a portion with a lower thickness, wherein the at least one of a scored surface and the portion of the profile of the diaphragm with the lower thickness is located adjacent an interface of the diaphragm and the main body.

17. A pressure vessel comprising:
   an outer support layer having an inner surface;
   a composite wrap disposed adjacent to the inner surface;
   a polymeric liner disposed adjacent to the composite wrap, an inner surface of the liner defining a closed cavity within the pressure vessel;
   an adapter disposed at a first end of the pressure vessel and configured for charging the cavity with a compressed fuel, wherein the adapter includes a first pressure relief device;
   a second pressure relief device disposed in the outer support layer, the second pressure relief device having:
      a main body with a chamber enveloping a chamber material, the chamber material filling the chamber, and
      a diaphragm abutting the liner and disposed between the chamber and the cavity, the chamber material abutting the diaphragm and supporting the diaphragm against a pressure of the cavity,
      wherein the diaphragm is adapted to rupture upon activation of the second pressure relief device and facilitate an evacuation of the chamber material and a compressed fuel from the cavity through the second pressure relief device.

18. The pressure vessel of claim 17, wherein the second pressure relief device is disposed at a second end of the pressure vessel.

19. The pressure vessel of claim 17, wherein the composite wrap comprises a material selected from the group consisting of glass composites, plastic composites, carbon composites, and combinations thereof.

20. A fuel cell propulsion system comprising:
   a fuel cell system having a fuel cell stack including a plurality of fuel cells, the fuel cell stack being configured to receive a compressed fuel from a pressure vessel;
   the pressure vessel comprising: an outer support layer having an inner surface; a composite wrap disposed adjacent to the inner surface; a liner disposed adjacent to the fiber composite wrap, an inner surface of the liner defining a closed cavity within the pressure vessel; an adapter disposed at a first end of the pressure vessel and configured for filling the cavity formed by the liner with the compressed fuel, wherein the adaptor includes a first pressure relief device; and a second pressure relief device disposed at a second end of the pressure vessel and forming a passage through the outer support layer and the composite wrap,
   the second pressure relief device having:
      a main body with a chamber enveloping a chamber material, the chamber material filling the chamber, and
      a diaphragm abutting the liner and disposed between the chamber and the cavity, the chamber material abutting the diaphragm and supporting the diaphragm against a pressure of the cavity,
      wherein the diaphragm is adapted to rupture upon activation of the pressure relief device and facilitate an evacuation of the chamber material and a compressed fuel from the cavity through the pressure relief device.

* * * * *